(12) United States Patent
Svedberg et al.

(10) Patent No.: US 10,924,533 B2
(45) Date of Patent: Feb. 16, 2021

(54) SYSTEM, APPARATUS AND METHOD FOR LOAD BALANCING

(71) Applicant: Telefonaktiebolaget LM Ericsson (publ), Stockholm (SE)

(72) Inventors: Johan Svedberg, Stockholm (SE); Robert Skog, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 336 days.

(21) Appl. No.: 15/555,115

(22) PCT Filed: Apr. 1, 2015

(86) PCT No.: PCT/EP2015/057252
§ 371 (c)(1),
(2) Date: Sep. 1, 2017

(87) PCT Pub. No.: WO2016/155826
PCT Pub. Date: Oct. 6, 2016

(65) Prior Publication Data
US 2018/0041570 A1    Feb. 8, 2018

(51) Int. Cl.
*H04L 29/08* (2006.01)
*H04L 29/06* (2006.01)
(Continued)

(52) U.S. Cl.
CPC .......... *H04L 67/1004* (2013.01); *G06F 9/505* (2013.01); *H04L 45/24* (2013.01);
(Continued)

(58) Field of Classification Search
CPC ...... G06F 9/505; G06F 9/5077; G06F 9/5033; H04L 45/24; H04L 67/1004;
(Continued)

(56) References Cited

U.S. PATENT DOCUMENTS

2013/0297765 A1* 11/2013 Zisapel ............... H04L 67/1008
                                                            709/223
2013/0318239 A1* 11/2013 Scharf .................... H04L 69/16
                                                            709/224
(Continued)

OTHER PUBLICATIONS

Scharf, M. "Multi-Connection TCP (MCTCP) Transport". Internet Engineering Task Force. Jul. 12, 2010. pp. 1-35. (Year: 2010).*
(Continued)

*Primary Examiner* — Christopher Biagini
(74) *Attorney, Agent, or Firm* — Patent Portfolio Builders, PLLC (57) ABSTRACT

A method of performing multi-path load balancing in a communications network comprising a plurality of servers comprises, in a server: receiving a first connection request from a first load balancer, sent from a first interface of a client device (step 301); and storing a code representing the server in a database, the code associated with a unique identity of the server (step 302). The method comprises, in a second load balancer: receiving a second connection request, from a second interface of the client device, wherein the second connection request is associated with the first connection request sent from the first interface of the client device to the server, and wherein the second connection request includes a code associated with the server (step 401); mapping the code to an entry in the database (step 402); determining the unique server identity associated with the code (step 403); and forwarding the second connection request to the server associated with the unique server identity (404).

15 Claims, 4 Drawing Sheets

(51) Int. Cl.
*H04L 12/707* (2013.01)
*G06F 9/50* (2006.01)

(52) U.S. Cl.
CPC ...... *H04L 67/1002* (2013.01); *H04L 67/1031* (2013.01); *H04L 69/14* (2013.01); *H04L 69/16* (2013.01); *G06F 9/5077* (2013.01)

(58) Field of Classification Search
CPC ... H04L 67/1031; H04L 69/16; H04L 47/125; H04L 67/02; H04L 67/10; H04L 67/1002; H04L 67/1008; H04L 67/1023
See application file for complete search history.

(56) References Cited

U.S. PATENT DOCUMENTS

| | | |
|---|---|---|
| 2014/0153583 A1 | 6/2014 | Gouache et al. |
| 2014/0258365 A1 | 9/2014 | L'Heureux et al. |
| 2014/0310391 A1* | 10/2014 | Sorenson, III .......... H04L 45/24 709/223 |
| 2015/0350337 A1* | 12/2015 | Biswas ................ H04L 67/142 709/228 |

OTHER PUBLICATIONS

Ford, et al. "TCP Extensions for Multipath Operation with Multiple Addresses". Internet Engineering Task Force. Oct. 25, 2010. pp. 1-44. (Year: 2010).*

* cited by examiner

SYSTEM, APPARATUS AND METHOD FOR LOAD BALANCING

TECHNICAL FIELD

This invention relates to a system, apparatus and method for load balancing, and in particular to a system, apparatus and method for performing load balancing in a communications network comprising a plurality of servers.

BACKGROUND

Load balancing is a function used in communications networks that comprise a plurality of servers, for example traffic servers, such as cloud-based systems. As the cloud grows it is useful not only to support stateless load balancing, where an algorithm (such as a hashtag algorithm) is used to direct a particular client to a particular server, but also to support stateful load balancing where each session is assigned to a particular server.

Stateful load balancing may be used during the dynamic increase or decrease of the number of traffic servers available in the cloud. In this case, the load balancer will continue to direct traffic to the servers until they are closed, and will start directing traffic to severs when connections become available.

Another typical use of stateful load balancing is for overload protection. If a specific traffic server is overloaded, stateful load balancing can be used to redirect any new traffic connections to other available traffic servers.

Multipath Transmission Control Protocol (Multipath TCP) defines an overlay connection from one device to a server on top of two of more existing connections, e.g. a TCP overlay connection on top of two or more TCP connections. For example, a device can be connected to the sever using both a 3G/LTE network and a WiFi network. This can assist a device with roaming between different access networks. For example, a single Multipath TCP connection can be created that seamlessly uses one 3G/LTE sub-connection and a second WiFi sub-connection.

Since the two sub-connections are typically setup on different networks, the IP-address of the client side of the connections will be different, and in different networks. Multipath TCP therefore associates the two or more connections to create a seamless single Multiplath TCP connection.

In order to scale a server that terminates Multipath TCP connections, some form of load balancing may be used. However, load balancing is not well suited for use with Multipath TCP.

SUMMARY

It is an aim of the present invention to provide a method and apparatus which obviate or reduce at least one or more of the disadvantages mentioned above.

According to the present invention there is provided a method of performing multi-path load balancing in a communications network comprising a plurality of servers. The method comprises, in a server: receiving a first connection request from a first load balancer, sent from a first interface of a client device; and storing a code representing the server in a database. The code is associated with a unique identity of the server. In a second load balancer the method comprises: receiving a second connection request, from a second interface of the client device, wherein the second connection request is associated with the first connection request sent from the first interface of the client device to the server, and wherein the second connection request includes a code associated with the server. The method further comprises mapping the code to an entry in the database; determining the unique server identity associated with the code; and forwarding the second connection request to the server associated with the unique server identity.

In some embodiments the first and second connection requests form part of a transmission control protocol (TCP).

The method may further comprise in the server, sending first and second acknowledgements of the first and second connection requests to the client device including the unique identity of the server.

In the first and second load balancer the method may comprise receiving a response to the first and second acknowledgments respectively. In some embodiments the first and second load balancer also determine the unique server identity from a TCP header; and forward the response to the server associated with the unique server identity.

In some embodiments the server stores the code representing the server in the database after receipt of the first response.

The first load balancer and the second load balancer may be the same.

According to a further aspect of the invention there is provided a method of performing multi-path load balancing, associated with a server. The method comprises receiving a first connection request from a first load balancer, sent from a first interface of a client device and storing a code representing the server in a database. The code is associated with a unique identity of the server, and the code is for use by a second load balancer to direct a second connection request, associated with the first connection request, to the server.

The first and second connection requests may form part of a transmission control protocol, TCP.

In some embodiments the server stores the code representing the server in the database after receipt of a first response message. The first response message may relate to a first acknowledgement message previously sent from the server to the client device upon receipt of the first connection request.

The code may comprise a token associated with a security key relating to the server.

According to a further aspect of the invention there is provided a method of performing multi-path load balancing in a load balancer. The method comprises receiving a second connection request, from a second interface of a client device, wherein the second connection request is associated with a first connection request sent from a first interface of the client device to a first server. The second connection request includes a code associated with the first server. The method further comprises mapping the code to an entry in a database; determining a unique server identity associated with the code; and forwarding the second connection request to a server associated with the unique server identity.

The first and second connection requests may form part of a transmission control protocol, TCP.

The method may further comprise receiving a first response to an acknowledgment of the first connection request, sent by the server to the client device; determining a unique server identity from the first response. The method may also comprise forwarding the response to the server associated with the unique server identity.

In some embodiments the method further comprises, receiving a second response to an acknowledgment of the second connection request, sent by the server to the client device, determining a unique server identity from the second response. The method may further comprise forwarding the response to the server associated with the unique server identity.

According to a further aspect of the invention there is provided a server for use with multi-path load balancing. The server comprises a communications module adapted to receive a first connection request from a first load balancer, sent from a first interface of a client device. The server may further comprise a processing module adapted to store a code representing the server in a database, the code associated with a unique identity of the server, wherein the code is for use by a second load balancer to direct a second connection request, associated with the first connection request, to the server.

According to a further aspect of the invention there is provided a load balancer for use with multi-path load balancing. The load balancer comprising a communications module adapted to receive a second connection request, from a second interface of a client device, wherein the second connection request is associated with a first connection request sent from a first interface of the client device to a first server, and wherein the second connection request includes a code associated with the first server. The load balancer may further comprise a processing module adapted to map the code to an entry in a database, and to determine a unique server identity associated with the code. The communications module is further adapted to forward the second connection request to a server associated with the unique server identity.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Embodiments of the present invention relate to the storing of a traffic server identity in a database for use in subsequent multipath requests, for example in use with load balancing, such as stateful load balancing.

Figure 1:
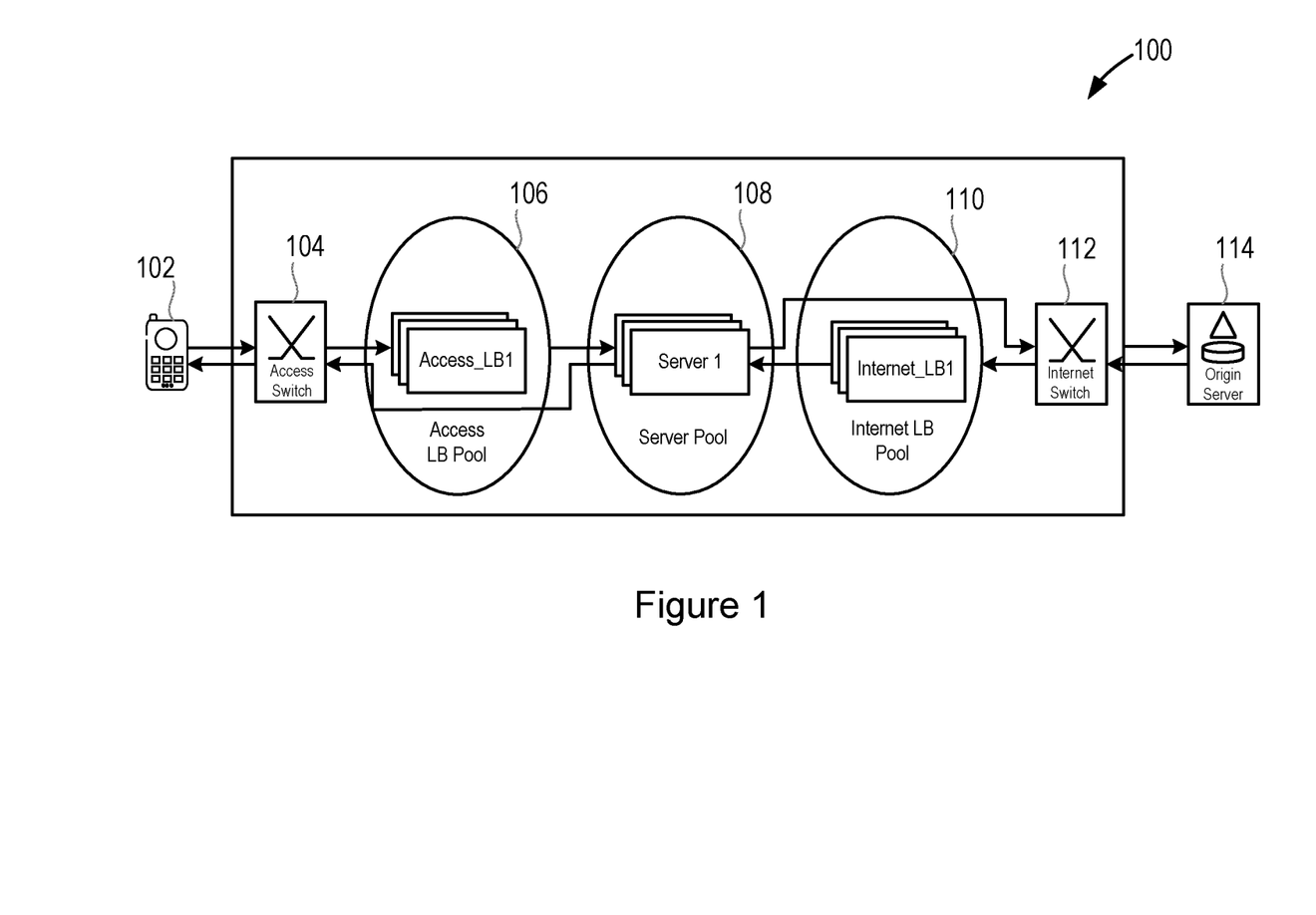
FIG. 1 illustrates a communications network according to some embodiments of the invention.

FIG. 1 illustrates an example of a communications network generally indicated 100, in which embodiments according to the invention may be used.

A client device, which in this illustrated example is a user equipment 102, is connected to an access switch 104 of the communications network 100. The access switch 104 is adapted to forward requests from the user equipment 102 to a load balancer in an access load balancer pool 106 (Access LB Pool) which may comprise a plurality of load balancers, for example the illustrated load balancer Access_LB1. Different requests sent by the user equipment 102 may be sent to different load balancers within this pool. The requests may be in any communications protocol. In some embodiments, the communications protocol may be a Transmission Control Protocol (TCP)

The load balancers within the access load balancer pool 106 are further connected to a plurality of traffic servers within the pool of traffic servers (Traffic Server Pool) 108. The access load balancers can forward the user requests to one of these plurality of traffic servers. These traffic servers may also connect back to the access switch 104.

A second pool of load balancers, namely an internet load balancer pool (Internet LB Pool) 110, is connected to the traffic server pool 108 and further connected to an Internet side access switch (Internet Switch) 112. The Internet access switch 112 is also configured to receive requests from the traffic server pool 108.

The Internet side access switch is further connected to an origin server 114. The origin server 114 may be provided, for example, in a large-scale provider of services over the Internet, such as Google or Facebook or any other provider of services.

This illustrated example shows a cloud-based system, in which there are pools of load balancers and traffic servers, with the numbers of load balancers and traffic servers being subject to change.

It will be appreciated that in embodiments of the invention the client device may comprise two or more interfaces which connect over different networks. For example, there may be one interface which may connect via a 3G/LTE network and a second interface which connects over WiFi. In this case, there may be two or more connections between the traffic server and the client device simultaneously.

In some embodiments of the invention the access load balancer pool will connect directly a server which is suitable for providing the requested services. In this case, there is no need to forward the traffic on to an origin server over the internet. In such an example the server pool 108, the Internet load balancer pool 110 and internet switch 112 may be omitted.

Figure 2:
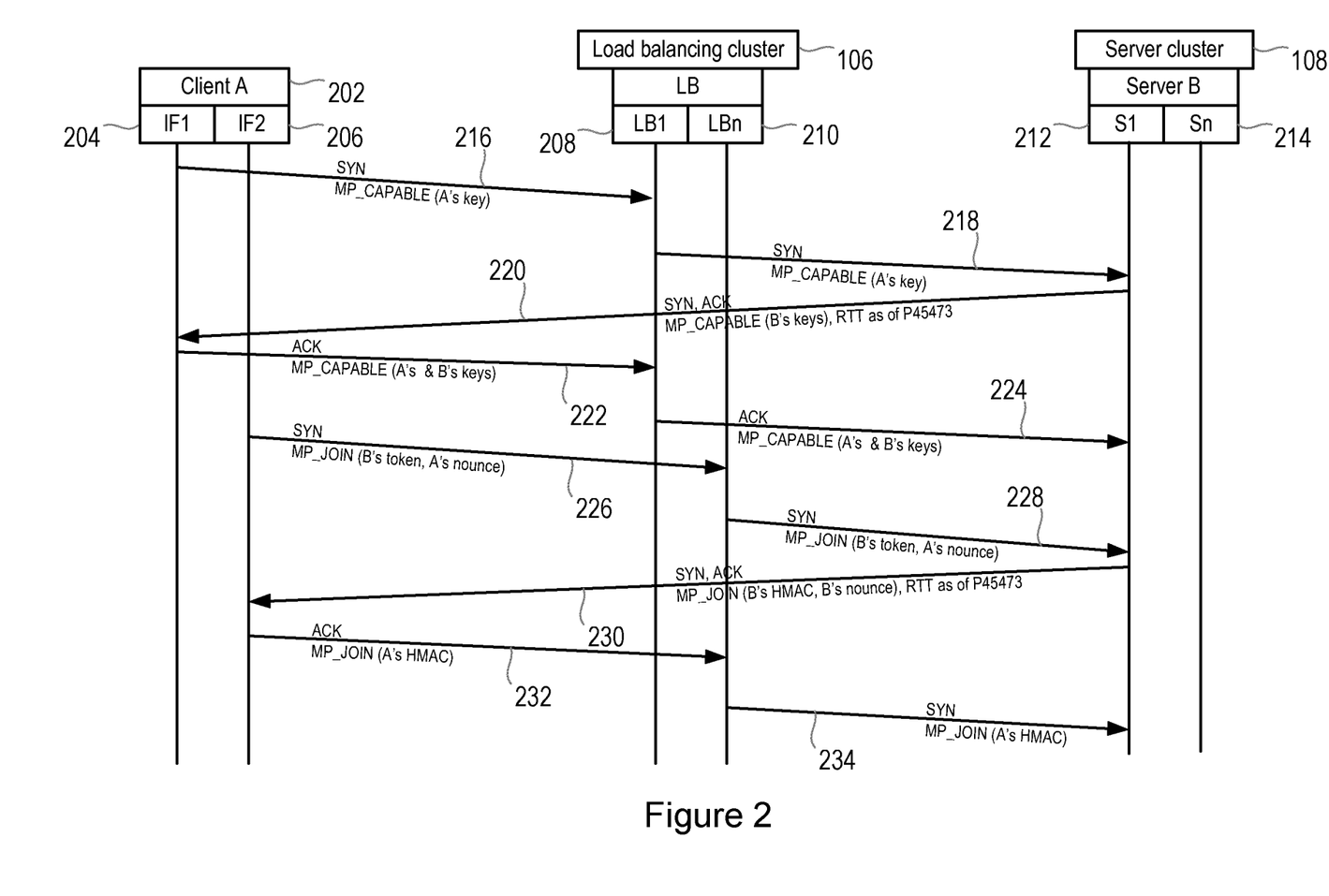
FIG. 2 illustrates a signalling diagram according to an embodiment of the invention.

FIG. 2 illustrates a signalling diagram according to an embodiment of the invention.

It can be seen from this figure that, in this example, client device 202 (Client A) comprises two communications interfaces, a first interface 204 and a second interface 206. These interfaces, as described earlier, may provide connections over different networks, for example, 3G/LTE and WiFi networks. Although the client device 202 of this example is described as having two communication interfaces, it is noted that embodiments of the invention may be used with client devices comprising more than two communication interfaces, for example for use with Multipath TCP connections comprising two or more sub-connections.

The Load balancing cluster 106 comprises a plurality of load balancers, for example n load balancers LB1-LBn The first load balancer 208 is specifically indicated LB1 and the remaining load balancers 210 are collectively indicated LBn. The Server cluster 108 comprises a plurality of servers, for example n servers S1-Sn. The first server 212 is specifically indicated S1 and the remaining servers 214 are collectively indicated Sn.

Firstly, it is assumed that the client device 202 sends a first connection request 216 from the first interface 204 to the first load balancer 208. This first connection request 216 may be a standard TCP request message, for example a MP_CAPABLE message, and may comprise a Key identifying client device 202 (e.g. Key A identifying Client A). In embodiments of the invention, this first connection request is a first sub-connection request for a Multipath TCP connection.

The first load balancer 208 then selects a server to use, for example using stateless load balancing. In some embodiments the stateless load balancing involves using a hashtag algorithm on the IP address and source port of the first connection request. The first load balancer 208 then forwards 218 the first connection request 216 to the selected server. In this example, the selected server is the first server 212.

When the first server 212 receives the first connection request 216/218, it returns a first acknowledgment 220 to the first interface 204 of the client device 202, bypassing the first load balancer 208. This first acknowledgment 220 may contain a unique identity of the server. It some embodiments, such as those described in a co-pending application by the present applicant, PCT/CN2015/075358, the unique server identity may be encoded into the timestamp of the first acknowledgment 220. Specifically, in some embodiments, the unique server identity is encoded into the TCP timestamp option.

As is conventional in a three-way handshake, this first acknowledgment 220 may be returned to the client device 202 along with a Key which identifies the Server cluster B (e.g. Key B identifying server cluster B).

The client device 202 will then send a first response 222 to the first acknowledgment 220 to the first load balancer 208. The first load balancer 208 will determine the unique server identity and forward 224 the first response 222 to the first server 212. Again, the server identity may be decoded from the time stamp as described in co-pending application PCT/CN2015/075358. In some embodiments, the first load balancer 208 will decode the server identity from the timestamp in a header of the first response 222.

The first response 222 may contain both of the Keys identifying the first server (Key B) and the client device 202 (Key A), for the server to validate the first response 222.

According to the embodiments of the present invention, when a server receives a first connection request 218 from a client device 202, it will store a code associated with the unique server identity in a database.

In one example, the first server 212 stores the code representing the server in the database after receipt of the first response 224. In one example, the code representing the server is stored after receipt of a MP_CAPABLE message.

In this example embodiment the code is a token associated with a security key relating to the first server (for example B's token). In particular, the token may be a hashtag algorithm of a security key used to authenticate the first communications response.

In some embodiments of the invention there are no further connection requests in the session, i.e. the Multipath capability of the client device is not utilised. In this case, the signalling may continue from the first interface of the client device, using the unique server identity encoded into the header of the responses to ensure that the traffic is sent to the same server.

However, in this example, the client device 202 sends a second connection request 226 from the second interface 206 to a load balancer. For example, this request may be an MP_JOIN request, a sub-connection request to the Multipath TCP connection. In this example the second connection request 226 is sent to a second load balancer 210 in the group of load balancers LBn. However, it will be appreciated that it may be sent instead to the first load balancer 208.

Therefore, in some embodiments, first load balancer and the second load balancer are the same.

This second connection request 226 may be sent with a token and a random number generated by the client device. The token may be a hashtag algorithm of the key received previously by the client device in the first acknowledgement. In one example the second connection request comprises B's token and A's nounce. The second connection request 226 may, in some embodiments, not contain any information directly identifying a specific server for the request to be directed to.

As this second connection request 226 is a new communication request from a different interface of the client device 202, there has been no opportunity for the first traffic sever to encode it's unique server identity into this second connection request, for example into the header of this second connection request 226 as mentioned above. Therefore, a different solution is needed in order to ensure that this second connection request 226 is sent to the same traffic sever as the first connection request 216.

As the request is a second connection request, for example identified by being a TCP MP_JOIN message, it is clear that it is a request which is intended to be related to a previous request, namely the first connection request 216.

Therefore, when the second load balancer 210 receives the second connection request 226, it maps the code, in this case the received token, to an entry in the database. The database will contain an entry comprising the code linked to a unique server identity. The second load balancer 210 will determine the unique server identity which is associated with the code. As the first server 212 has previously stored the code in the database alongside its own unique server identity, the unique server identity which is retrieved by the second load balancer 210 is the first server's 212 unique server identity.

The second load balancer 210 can then forward 228 the second connection request 226 to the server associated with the retrieved server identity, namely the first server 212.

When the first server receives the second connection request 226, it returns a second acknowledgment 230 to the second interface 206 of the client device 202, bypassing the second load balancer 210. This first acknowledgment 230 may contain the unique identity of the first server 212. In some embodiments, such as those described in co-pending application PCT/CN2015/075358 by the present Applicant, the unique server identity is encoded into the timestamp of the second acknowledgment 230, for example a TCP timestamp.

The client device 202 will send a second response 232 to the second acknowledgment 230 to the second load balancer 210. The second load balancer 210 will determine the unique server identity and forward 234 the second response 232 to the first server 212. In some embodiments, the load balancer will determine the server identity in this step by decoding the server identity from the timestamp in the header of the second response 232.

In embodiments of the invention, both connections from the first interface 204 and the second interface 206 in this multipath session will now be set up so that the server identity is automatically encoded into responses. Therefore, the future traffic in this session from both interfaces can all be sent to the same server.

In can be seen that, according to one embodiment, the communications network in FIG. 1 is therefore configured to perform a method comprising, in a server 212, receiving a first connection request 218 from a first load balancer 208, sent from a first interface 204 of a client device 202, and storing a code representing the server 212 in a database, the code associated with a unique identity of the server 212. The method also comprises, in a second load balancer 210, receiving a second connection request 226, from a second interface 206 of the client device 202, wherein the second connection request 226 is associated with the first connection request 216 sent from the first interface 204 of the client device 202 to the server 212, and wherein the second connection request 226 includes a code associated with the server 212. The method also comprises the second load balancer 210 using the code to access the database, determine the unique server identity associated with the code, and forward the second connection request 226 to the server 212 associated with the unique server identity.

It will be appreciated that the first and second connection requests 216, 226 may form part of a transmission control protocol, TCP, or any other suitable protocol.

In some embodiments, the method the communications network is configured to perform may also comprise the server sending first and second acknowledgements 220, 230 of the first and second connection requests to the client device including the unique identity of the server.

Furthermore, the method may comprise the first and second load balancers receiving a response to the first and second acknowledgments respectively; determining the unique server identity from a TCP header; and forwarding the response to the server associated with the unique server identity.

Figure 3:
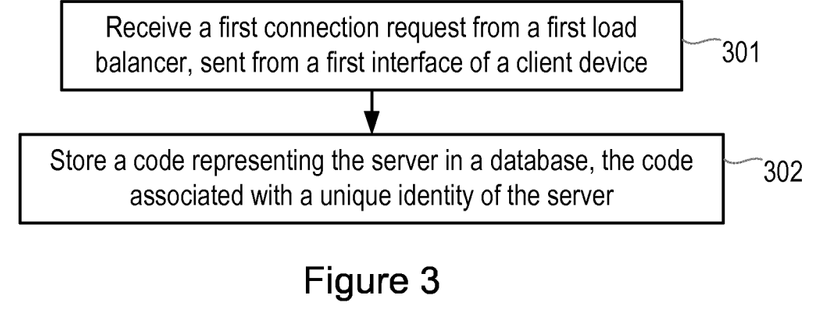
FIG. 3 shows a flow chart illustrating a method performed by a traffic server according to embodiments of the invention.

FIG. 3 shows a flow chart illustrating a method performed by a server according to an embodiment of the invention, for example a traffic server, or some other form of server.

In step 301 the server receives a first connection request from a first load balancer, sent from a first interface of a client device.

In some embodiments the first connection request is a TCP SYN request that indicates it is a first sub-connection in a Multipath TCP connection. For example, it may have an MP_CAPABLE option.

A unique key may also be generated by the server and returned to the client in a SYN/ACK response.

In step 302 the server stores a code representing the server in a database, the code associated with a unique identity of the server. The database may be a global database or may be located at any node in the communications network.

In some embodiments this code is generated by calculating a hash of the unique key. This may then be stored alongside the unique server identity in the database.

In some embodiments the code is for use by a second load balancer to direct a second connection request, associated with the first connection request, to the server. The first and second load balancers may be different load balancers, or the same load balancer.

It will be appreciated that the first and second connection requests may form part of a transmission control protocol (TCP), or any other suitable protocol.

In some embodiments the server stores the code representing the server in the database after receipt of a first response message 224/222, the first response message 224/222 relating to a first acknowledgement message 220 previously sent from the server to the client device upon receipt of the first connection request 218/216.

Therefore storing the code, enables a subsequent connection request, relating to the first connection request, to be sent to the same server as the first connection request. For example, the client may later create a second sub-connection in the Multipath TCP, an MP_JOIN request, and the code can be retrieved from the database and sent along with the request. This would enable the request to be sent to the same server.

It will be appreciated that the code may comprise a token associated with a security key relating to the server. In particular, the code may be a token used in a three-way handshake in multipath TCP. The token may be a hash of the security key used to authenticate the first connection request.

Figure 4:
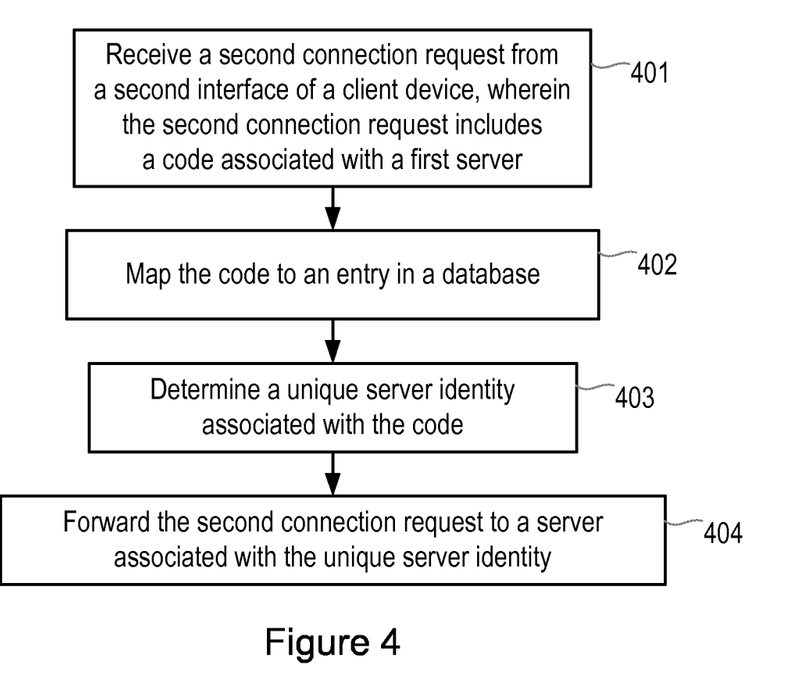
FIG. 4 shows a flow chart illustrating a method performed by a load balancer according to embodiments of the invention.

FIG. 4 shows a flow chart illustrating a method performed by a load balancer according to an embodiment of the invention.

In step 401 the load balancer receives a second connection request, from a second interface of a client device, wherein the second connection request includes a code associated with a first server. In some embodiments the second connection request is associated with a first connection request sent from a first interface of the client device to the first server.

It will be appreciated that the first and second connection requests may form part of a transmission control protocol (TCP), or any other suitable protocol.

In some embodiments the load balancer may receive a first response to an acknowledgment of the first connection request, sent by the server to the client device. It may then determine a unique server identity from the first response; and forward the response to the server associated with the unique server identity.

In step 402 the load balancer maps the code to an entry in a database. The database may be a global database or may be located at any node in the communications network.

In step 403 the load balancer determines a unique server identity associated with the code.

In step 404 the load balancer forwards the second connection request to a server associated with the unique server identity.

In some embodiments the load balancer may receive a second response to an acknowledgment of the second connection request, sent by the server to the client device. The load balancer may then determine a unique server identity from second response and forward the response to the server associated with the unique server identity.

Figure 5:
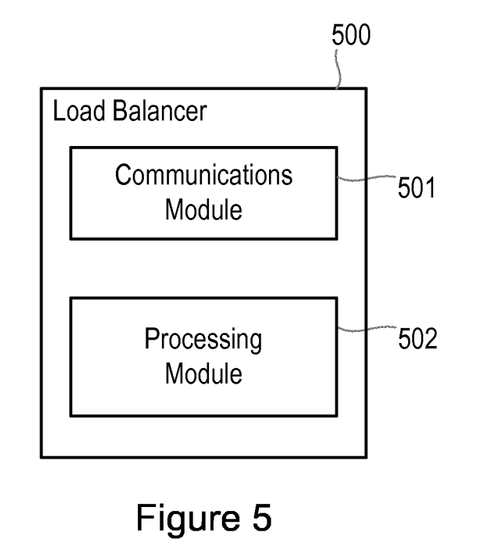
FIG. 5 illustrates a load balancer according to embodiments of the invention.

FIG. 5 illustrates an example of a load balancer generally indicated 500 according to an embodiment of the invention. Any or all of the load balancers in the load balancer pools 106 and 110 shown in FIG. 1 may have this structure. In this embodiment, the load balancer 500 comprises a communications module 501 and a processing module 502.

The communications module 501 is adapted to handle communications with other network nodes in the intended communications protocol(s). For example, the load balancer may be required to communicate with other network nodes over the Internet using the Transmission Control Protocol (TCP).

The processing module 502 allows the load balancer 500 to perform the functions required for its operation, including the functions described herein.

In one embodiment, the communications module 501 is adapted to receive a second connection request, from a second interface of a client device. The second connection request may be associated with a first connection request sent from a first interface of the client device to a first server. The second connection request may include a code associated with the first server.

The processing module 502 is adapted to map the code to an entry in a database, and to determine a unique server identity associated with the code.

The communications module 501 is further adapted to forward the second connection request to a server associated with the unique server identity.

Figure 6:
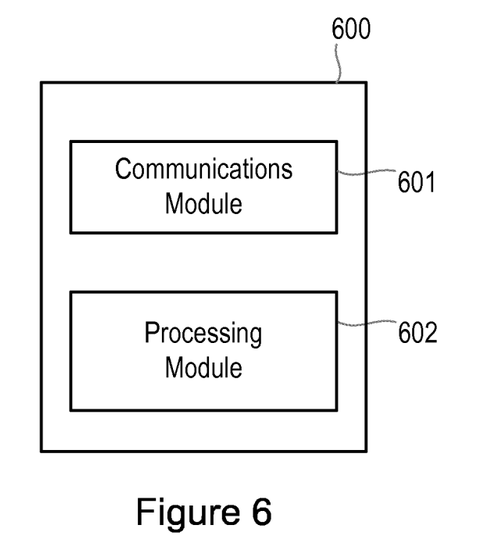
FIG. 6 illustrates a traffic server according to embodiments of the invention.

FIG. 6 illustrates an example of a server generally indicated 600 according to embodiments of the invention. Any or all of the servers in the server pool 108 illustrated in FIG. 1 may have this structure. In this embodiment the server 600 comprises a communications module 601 and processing module 602.

The communications module 601 is adapted to handle communications with other network nodes in the intended communications protocol(s). For example, the server may be required to communicate with other network nodes over the Internet using the Transmission Control Protocol (TCP).

The processing module 602 allows server 600 to perform the functions required for its operation, including the functions described herein.

In one embodiment, the communications module 601 is adapted to receive a first connection request from a first load balancer, sent from a first interface of a client device.

The processing module 602 is adapted to store a code representing the server in a database, the code associated with a unique identity of the server. The code may be for use by a second load balancer to direct a second connection request, associated with the first connection request, to the server.

There is thus described a method and system for performing multipath load balancing. In particular, a method of maintaining a multipath connection to a particular server during stateless load balancing.

As mentioned above, although the embodiments above have been described in the context of a client device having first and second interfaces, and a Multipath TCP connection comprising first and second sub-connections, the embodiments may also be used with client devices having more than two interfaces, and Multipath TCP connections having more than two sub-connections.

The use of a code representing the server in a database, the code associated with a unique identity of the server, enables Multipath TCP connections to be established in a load balancing environment, even though the way MPTCP is defined means that only the initial TCP handshake of the sub-connections includes enough information to associate them with each other. The embodiments of the invention there allow a load balancer to learn from the various handshake messages which TCP connections that need to go to the same server.

The embodiments of the present invention build on the load balancing techniques described in co-pending application PCT/CN2015/075358 by the present Applicant, in that when a first sub-connection is established a server records unique identity of the server, for example the server B's token (e.g. Hash of B's key) as key to subsequently point to the server's address in database, wherein this database is accessible from all servers and load balancers in this domain. Thus, when at a later point any of the distributed load balancers see a new sub-connection, for example indicated by the MP_JOIN TCP option in TCP SYN segment, it can use B's token provided in the MP_JOIN TCP option to look-up the server in the database. The SYN is then forwarded to the correct server (which may then use the method of co-pending application PCT/CN2015/075358 by the present Applicant, to control that the following segments in the new sub-connection will also come to the same server).

The embodiments have the advantage of being able to provide a Multipath TCP solution that can be deployed without a stateful and tight coupled load balancer.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of performing multi-path load balancing in a communications network comprising a plurality of servers, the method comprising:
   in a server of the plurality of servers:
      receiving a first connection request, from a first load balancer, sent from a first interface of a client device;
      sending a first acknowledgement of the first connection request to the first interface of the client device bypassing the first load balancer; and
      storing a code representing the server in a database, the code associated with a unique identity of the server;
   in a second load balancer:
      receiving a second connection request from a second interface of the client device, wherein the second connection request is associated with the first connection request sent from the first interface of the client device to the server, wherein the second connection request includes a token associated with the server, wherein the token associated with the server is received from the second interface of the client device, and wherein the second load balancer is different from the first load balancer;
      mapping the token to an entry in the database;
      determining the unique server identity associated with the token; and
      forwarding the second connection request to the server associated with the unique server identity.

2. The method of claim 1, wherein the first and second connection requests form part of a transmission control protocol (TCP).

3. The method of claim 1, further comprising, in the server, sending a second acknowledgement of the second connection request to the client device, wherein the first and second acknowledgements include the unique identity of the server.

4. The method of claim 3, further comprising, in the first and second load balancer:
   receiving a first and second response to the first and second acknowledgments, respectively;
   determining the unique server identity from a transmission control protocol (TCP) header; and
   forwarding the first and second response to the server associated with the unique server identity.

5. The method of claim 4, wherein the server stores the code representing the server in the database after receipt of the first response.

6. A method of performing multi-path load balancing, associated with a server, the method comprising:
   receiving a first connection request, from a first load balancer, sent from a first interface of a client device;
   sending a first acknowledgement of the first connection request to the first interface of the client device bypassing the first load balancer;
   storing a code representing the server in a database, the code associated with a unique identity of the server; and receiving a second connection request, from a second load balancer, sent from a second interface of the client device, wherein the second connection request includes a token associated with the server, and wherein the second load balancer is different from the first load balancer.

7. The method of claim 6, wherein the first and second connection requests form part of a transmission control protocol (TCP).

8. The method of claim 6, wherein the server stores the code representing the server in the database after receipt of a first response, the first response relating to the first acknowledgement.

9. The method of claim 6, wherein the code comprises the token associated with a security key relating to the server.

10. A method of performing multi-path load balancing in a load balancing cluster comprising a first and second load balancer, the method comprising:
in the first load balancer:
receiving a first connection request from a first interface of a client device;
forwarding the first connection request to a first server of a plurality of servers; and
receiving a first response to a first acknowledgment of the first connection request from the first interface of the client device, wherein the first response contains keys identifying the first server and the client device;
in the second load balancer:
receiving a second connection request from a second interface of the client device, wherein the second connection request includes a token associated with the first server, and wherein the second load balancer is different from the first load balancer;
mapping the token to an entry in a database;
determining a unique server identity associated with the token; and
forwarding the second connection request to the first server associated with the unique server identity.

11. The method of claim 10, wherein the first and second connection requests form part of a transmission control protocol (TCP).

12. The method of claim 11, further comprising, in the first load balancer:
determining the unique server identity from the first response; and
forwarding the first response to the first server associated with the unique server identity, wherein the first acknowledgement is sent from the first server to the client device.

13. The method of claim 10, further comprising, in the second load balancer:
receiving a second response to a second acknowledgment of the second connection request, sent by the first server to the client device;
determining the unique server identity from the second response; and
forwarding the second response to the first server associated with the unique server identity.

14. A server for use with multi-path load balancing, the server comprising:
a communications circuit configured to:
receive a first connection request, from a first load balancer, sent from a first interface of a client device; and
send a first acknowledgement of the first connection request to the first interface of the client device bypassing the first load balancer; and
a processing circuit configured to:
store a code representing the server in a database, the code associated with a unique identity of the server; and
receive a second connection request, from a second load balancer, sent from a second interface of the client device, wherein the second connection request includes a token associated with the server, and wherein the second load balancer is different from the first load balancer.

15. A load balancing cluster comprising a first and second load balancer for use with multi-path load balancing, the load balancing cluster comprising:
the first load balancer, wherein the first load balancer comprises:
a first communications circuit configured to:
receive a first connection request from a first interface of a client device;
forward the first connection request to a first server of a plurality of servers; and
receive a first response to a first acknowledgment of the first connection request from the first interface of the client device, wherein the first response contains keys identifying the first server and the client device; and
the second load balancer, wherein the second load balancer comprises:
a second communications circuit configured to receive a second connection request from a second interface of the client device, wherein the second connection request includes a token associated with the first server, and wherein the second load balancer is different from the first load balancer; and
a second processing circuit configured to:
map the token to an entry in a database; and
determine a unique server identity associated with the token,
wherein the second communications circuit is further configured to forward the second connection request to the first server associated with the unique server identity.

* * * * *